J. LAVOIE.
ELECTRIC HEATER.
APPLICATION FILED NOV. 26, 1919.

1,397,872.

Patented Nov. 22, 1921.

Inventor
Joseph Lavoie
By E. J. Fetherstonhaugh
Attorney

UNITED STATES PATENT OFFICE.

JOSEPH LAVOIE, OF MONTREAL, QUEBEC, CANADA.

ELECTRIC HEATER.

1,397,872.   Specification of Letters Patent.   Patented Nov. 22, 1921.

Application filed November 26, 1919. Serial No. 340,959.

(GRANTED UNDER THE PROVISIONS OF THE ACT OF MARCH 3, 1921, 41 STAT. L., 1313.)

*To all whom it may concern:*

Be it known that I, JOSEPH LAVOIE, a subject of the King of Great Britain, and residing at 165 Amherst street, in the city and District of Montreal, in the Province of Quebec, in the Dominion of Canada, have invented a new and useful Electric Heater, of which the following is the specification.

The invention relates to electric heaters as described in the present specification and illustrated in the accompanying drawings that form part of the same.

The invention consists essentially in the novel construction and arrangement of parts, whereby the heater is readily converted from a room warmer to a cooker and vice versa.

The objects of the invention are to furnish the public with an article that will meet the wants of the present day in regard to tenants of small apartments and rooms, where the space is limited and the conveniences few and thus insure comfort for a great and numerous class of workers at a very moderate expense; to accomplish this purpose in a simple and effective way; and generally to provide a cheap, durable and efficient heater.

Figure 1:
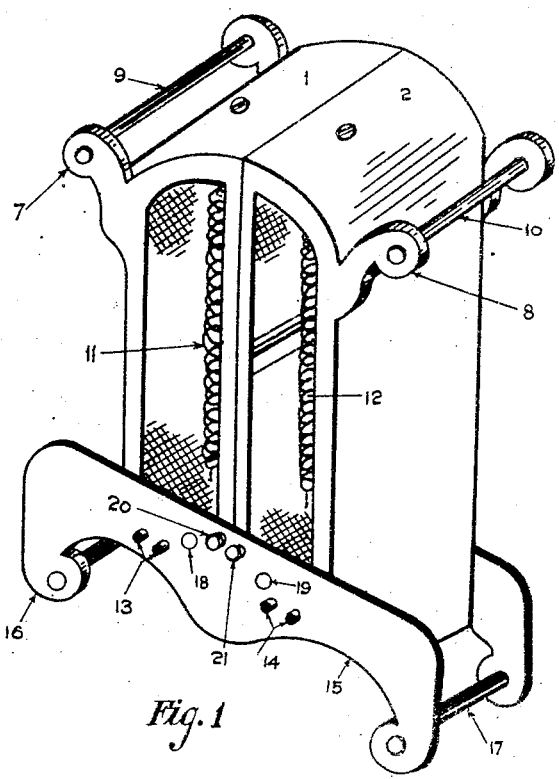

In the drawings, Figure 1 is a perspective view of the heater as a room warmer.

Figure 2:
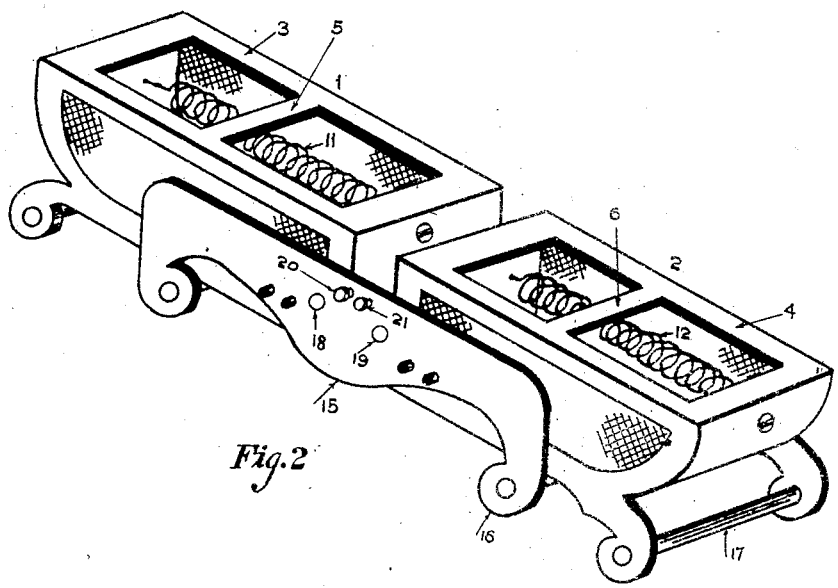

Fig. 2 is a perspective view of the heater as a cooking stove.

Like numerals of reference indicate corresponding parts in each figure.

Referring to the drawings, the shell of the heater is divided vertically and centrally in two parts 1 and 2 and each is preferably formed at the top, so in meeting they form an arch, while at the bottom end they are flat. The meeting inner frames 3 and 4 are each preferably divided centrally by the bars 5 and 6 to form a plurality of holes over which cooking utensils are supported.

The brackets 7 and 8 project outwardly from the shell at the upper ends of each half in pairs and form legs in the cooker position, said brackets being joined by the rails 9 and 10.

The heating elements 11 and 12 are inclosed in the shell parts 1 and 2 and connected to the connecting posts 13 and 14 mounted in the base 15, the latter being formed of two similar ends standing on the legs 16, preferably forming part therewith and joined by the rails 17.

The frames 1 and 2 are pivotally supported in the base 15 by the pivot pins 18 and 19 or in any suitable way and are preferably held to their upper position by the locking pins 20 and 21.

Any kind of screen facings or grid coverings may be used according to the judgment of the maker.

In the operation of the heater, the shell parts are held to their upper position by the locking pins and in use as a room warmer may be connected up to the source of current and moved about as desired.

To convert the heater from a room warmer all that is necessary is to remove the locking pins and let the shell parts drop on to the brackets 7 and 8, which thus become legs for supporting the cooking stove. There is no change necessary in the connections as these are not disturbed by the conversion.

Various changes may be made in the details of the construction without departing from the spirit of the invention, and so long as these changes are within the scope of the claim for novelty following, the protection accorded shall not be invalidated.

What I claim is:—

In an electric heater, a frame or shell formed in two parts folding together and having meeting faces in their closed positions and in their open position formed for cooking utensils and lugs forming legs and fender rail supports, a base, heating elements, electric connectors in said base and connected to said elements and means for supporting said frames in their upright positions.

Signed at the city of Montreal, Province of Quebec, Dominion of Canada, this 21st day of November, 1919.

JOSEPH LAVOIE.